United States Patent
Li et al.

(10) Patent No.: US 9,088,731 B2
(45) Date of Patent: Jul. 21, 2015

(54) LIGHT SOURCE, CONTROL METHOD FOR LIGHT SOURCE, AND PROJECTION SYSTEM HAVING LIGHT SOURCE

(75) Inventors: Yi Li, Pleasanton, CA (US); Quanquan Chen, Shenzhen (CN)

(73) Assignee: APPOTRONICS CORPORATION LIMITED, Shenzhen (CN)

( * ) Notice: Subject to any disclaimer, the term of this patent is extended or adjusted under 35 U.S.C. 154(b) by 629 days.

(21) Appl. No.: 13/263,286

(22) PCT Filed: Apr. 7, 2010

(86) PCT No.: PCT/CN2010/000452
§ 371 (c)(1),
(2), (4) Date: Nov. 4, 2011

(87) PCT Pub. No.: WO2010/115345
PCT Pub. Date: Oct. 14, 2010

(65) Prior Publication Data
US 2012/0120120 A1     May 17, 2012

(30) Foreign Application Priority Data
Apr. 7, 2009    (CN) .......................... 2009 1 0106527

(51) Int. Cl.
*G03B 21/20*   (2006.01)
*H04N 9/31*    (2006.01)

(52) U.S. Cl.
CPC ............ *H04N 9/3114* (2013.01); *G03B 21/204* (2013.01); *H04N 9/3164* (2013.01); *H04N 9/3111* (2013.01)

(58) Field of Classification Search
CPC ............. G03B 21/204; G03B 21/2013; G03B 26/008; H04N 9/3111; H04N 9/3114; H04N 9/3117; H04N 9/3164

USPC ........ 353/84, 94, 30, 31; 348/743; 250/484.2, 250/484.4; 359/885–892
See application file for complete search history.

(56) References Cited

U.S. PATENT DOCUMENTS 7,178,950 B2 *   2/2007   Biber et al. ................... 362/345
7,245,280 B2 *   7/2007   Park ............................... 345/84
(Continued)

FOREIGN PATENT DOCUMENTS

CN        101051175      10/2007
JP        2007-158460    6/2007
(Continued)

OTHER PUBLICATIONS

English translation of Written Opinion in a parent PCT application No. PCT/CN2010/000452, dated Jul. 15, 2010.
(Continued)

*Primary Examiner* — William C Dowling
*Assistant Examiner* — Ryan Howard
(74) *Attorney, Agent, or Firm* — Chen Yoshimura LLP

(57) ABSTRACT

A light source includes a first light emitting source (2), a second light emitting source (3), a color-adjusting apparatus (1) with light wavelength conversion material, a control unit, and a positioning apparatus provided on the color-adjusting apparatus (1). The positioning apparatus sends a positioning signal which indicates a position of the color-adjusting apparatus to the control unit. The control unit outputs a control signal to the power switch of the second light emitting source so that the second light emitting source is controlled to stop emitting the light when the light generated by the color-adjusting apparatus is the same as that of the first light emitting source. A control method for light source and a projection system having light source are also disclosed.

18 Claims, 3 Drawing Sheets

(56) References Cited

U.S. PATENT DOCUMENTS

2005/0122485 A1\* 6/2005 Kao et al. .................. 353/84
2006/0126198 A1\* 6/2006 Niwa et al. ................. 359/892
2009/0034284 A1\* 2/2009 Li et al. ..................... 362/554

FOREIGN PATENT DOCUMENTS

JP  2008-233604  10/2008
WO  2007/119510  10/2007

OTHER PUBLICATIONS

International Search Report and Written Opinion in the parent PCT application No. PCT/CN2010/000452, dated Jul. 15, 2010.

International Search Report in the parent PCT application No. PCT/CN2010/000452, dated Jul. 15, 2010.

\* cited by examiner

LIGHT SOURCE, CONTROL METHOD FOR LIGHT SOURCE, AND PROJECTION SYSTEM HAVING LIGHT SOURCE

BACKGROUND OF THE INVENTION

1. Field of the Invention

The present invention relates to light emitting/lighting devices and systems, and in particular, it relates to a control method and apparatus for the light source in projection systems.

2. Description of the Related Art

A typical projection system includes a light source system which includes several primary color light sources, e.g. including but not limited to red, green, and blue light sources generating red (R), green (G) and blue (B) light respectively. The projection system further includes a light valve for modulating the red, green and blue light to form a color image, and a projection lens for projecting the modulated red, green and blue light onto a screen to form the image. The red, green and blue light can be combined and delivered to the light valve in a manner of but not limited to being directed by optical fibers to a color-combining prism. The light valve may be a micro-electro-mechanical (MEMS) system such as a spatial light modulator (SLM) based on the Texas Instrument (TI)'s Digital Light Processing (DLP) technology. The image signal processor (ISP) of the projection system controls the light source system by a driving signal and provides the image data for the SLM, for example, a digital micromirror device (DMD). For example, when red light source is on to generate a red light, the ISP provides the red image data for the SLM. Similarly, when the green/blue light source is on to generate green/blue light, the ISP provides the corresponding green/blue image data for the SLM. If all the red, green and blue light sources are on, grey image data will be provided for the SLM. The light source system may also provide a feedback signal for the ISP, which forms a feedback loop together with the driving signal to keep the chromaticity and luminance of the light sources stable. The modulated light final is projected by a projection lens onto a screen to form the image.

For its relatively low cost, an Ultra High Performance (UHP) lamp is generally used in current projection systems as a light source to generate white light. The white light passes through a color-adjusting apparatus, for example, a segmented color filter which can respectively transmit red, green and blue primary color light necessary for projection. This solution has a number of disadvantages: UHP lamps need a high startup voltage which is usually several thousand volts; UHP lamps have a long switching time between on and off states; the output colored light has a small color gamut; and UHP lamps have a short lifetime of about 2,000 hours.

With its technology development, light emitting diodes (LEDs) are used more and more in light source systems without the above disadvantages. For example, different colored LEDs are used to generate different primary color light beams such as red, green, blue and yellow light, which have the advantages of a large color gamut and long lifetime (about 20,000 hours).

To reduce the cost and increase the luminance of output light from the light source, current LED light source systems usually have single color LEDs and a color-adjusting apparatus with wavelength conversion materials to generate different colored light. Referring to the color wheel as an example of the color-adjusting apparatus, the color wheel is usually composed of several segments containing different phosphors. When the wheel rotates, the LED light illuminate the wheel's different segments at different time, thus emitting different single color light sequentially corresponding to different phosphors of the segments. For example, blue LEDs can be used to generate necessary red, green and blue light in three colors' projection display systems.

To further increase the luminance of the output light, UV LEDs can be used together with blue LEDs to excite the phosphors in a LED based light source. A schematic structure of such a light source is shown in FIG. 1. In this structure, the first light emitting source 2 is blue LEDs, and the second light emitting source 3 is UV LEDs. Light coupling/conducting apparatus 6 collects the light from the first and second light emitting source 2 and 3, and directs the collected light to a rotary color wheel 1 with segments. As shown in FIG. 3, the segmented wheel may be divided into four segments (for example, a, b, c and d segments) which contain red (R), green (G), blue (B) phosphors respectively. Two segments of them both contain the same blue phosphor. Therefore, the wheel has four segments with three different wavelength conversion characteristics. The light coupling/conducting apparatus 6 may be a multi-optical fiber that includes several optical fibers. As shown in FIG. 1, one end of the multi-optical fiber 6 is two optical fibers 62 coupling and collecting the light from the first light emitting source 2 and second light emitting source 3, and the other end is one optical fiber 63 combined by the two optical fibers directing the collected light to the color wheel 1.

A more compact structure of the current light source systems with lower cost is shown in FIG. 2. A dichroic filter 5 that can transmit blue light and reflect UV light is used in place of the light coupling/conducting apparatus 6 of FIG. 1, to combine the blue excitation light 41 and UV excitation light 42 into one light path directed to the color wheel 1. In order to fully use combined excitation light, a lens 7 is usually inserted in the light path to focus the light onto the segmented color wheel 1.

There is a disadvantage of the current technology described above. For example, when the first light emitting source 2 is blue LEDs, the blue segments of the wheel in FIG. 3 contain no phosphor and can transmit blue light, directing the light from the blue LEDs for output light of the light source, therefore, the UV light from the second light emitting source 3 is not used here. Because UV light can cause harm to human eyes, a filter preventing the unused UV light from passing through are necessary in the light path, for example, after the color wheel. It is obvious that such systems waste some UV light and have additional cost.

SUMMARY OF THE INVENTION

The present invention discloses a light source and control method without the disadvantages of the technology described above, which can reduce the power consumption and cost of the light source, especially in projection system.

To solve the technology problem above, embodiments of the present invention provides an apparatus that can be set to monitor the color wheel's position and the power of the UV light source can be controlled according to this position. Thus, when the blue segment of the wheel is illuminated by the light path, the UV light source can be shut off to reduce power consumption and avoid the harm to human eyes. In addition, the UV light source is pulse driven, which can increase its lifetime.

An embodiment of the present invention provides: a light source which includes a first light emitting source, a second light emitting source, and a color-adjusting apparatus with segments of at least two different light wavelength conversion characteristics; the light from the first light emitting source and the second light emitting source is directed through a light path to the color-adjusting apparatus, and different segments of the color-adjusting apparatus are in the light path and illuminated by the light at different times when the color-adjusting apparatus is moving; particularly, one segment contains no wavelength conversion material, and this segment allows the light from the light path which is emitted by the first light emitting source to be output as on output light of the light source; the light source further includes a positioning apparatus on the color-adjusting apparatus, the positioning apparatus providing a positioning signal synchronized with the movement of the color-adjusting apparatus to the control unit, the control unit providing a control signal to the power supply of the second light emitting source.

In one embodiment, the color-adjusting apparatus includes a color rotating wheel, moving plate or rotating cylinder.

In one embodiment, the first light emitting source is a blue LED, and the second light emitting source is an ultraviolet (UV) LED.

In one embodiment, the control unit also provides another control signal to the power supply of the first light emitting source.

In one embodiment, the light source further includes a dichroic filter that combines the light from its two sides emitted by the first light emitting source and the second light emitting source into the light path in a manner of transmitting and reflecting the light respectively.

In one embodiment, the light source further includes a multi-optical fiber. One end of the multi-optical fiber includes two optical fibers coupling and collecting the light from the first light emitting source and second light emitting source, and the other end is one optical fiber combined by the two optical fibers directing the collected light to the color wheel.

Another aspect of the present invention includes a control method for a light source, which includes:

providing a light source, the light from a first light emitting source and a second light emitting source being directed through a light path to a color-adjusting apparatus;

dividing the moving surface of the color-adjusting apparatus into at least two segments, wherein the segments have different wavelength conversion characteristics by containing different (including no) wavelength conversion materials, the movement of the surface resulting in that different segments are disposed in the light path at different times to generate output light of different wavelength sequentially;

wherein one segment of the color-adjusting apparatus contains no wavelength conversion material, this segment allowing the light from the light path which is emitted by the first light emitting source to be output as an output light of the light source;

monitoring the movement of the color-adjusting apparatus and controlling the second light emitting source wherein the second light emitting source is shut off when the segment containing no wavelength conversion material is disposed in the light path.

An embodiment of the invention further includes: controlling both the first light emitting source and the second light emitting source according to the monitoring result so that both first light emitting source and the second light emitting source are shut off in a specific period.

In one embodiment, the movement of the color-adjusting apparatus is monitored by a positioning apparatus on the color-adjusting apparatus, the positioning apparatus generating a positioning signal synchronized with the movement of the color-adjusting apparatus for the control unit of the light source.

Yet another aspect of the present invention further provides a projection system having a light source. The projection system includes:

a light source that includes a first light emitting source, a second light emitting source, and a color-adjusting apparatus including at least three segments with different wavelength conversion characteristics, wherein the light from the first light emitting source and the second light emitting source is directed through a light path to the color-adjusting apparatus, different segments of the color-adjusting apparatus being disposed on the light path at different times when the color-adjusting apparatus is moving, to generate output light of different wavelength sequentially including red, green and blue colors.

The projection system further includes a light valve for modulating the red, green and blue light to form a color image.

The projection system further includes a projection lens for projecting the modulated red, green and blue light onto a screen to form the image.

The projection system further includes an image signal processor controlling the output light of the light source system by a driving signal and providing the image data for the light valve.

Especially, one segment of the color-adjusting apparatus contains no wavelength conversion material, this segment allowing the light from the light path which is emitted by the first light emitting source to be output as an output light of the light source.

The light source further includes a positioning apparatus on the color-adjusting apparatus providing a positioning signal for the control unit of the projection system, the control unit providing a control signal for the power supply of the second light emitting source.

In one embodiment, the first light emitting source is a blue LED, the second light emitting source is a UV LED, and the segments of the color-adjusting apparatus include a segment or segments with a red phosphor and a segment or segments with a green phosphor. The control unit is a unit in the image signal processor.

The devices according to the above embodiments have the advantages such as less power consumption, simple control, and easy to implement.

DETAILED DESCRIPTION OF THE PREFERRED EMBODIMENTS

Figure 1:
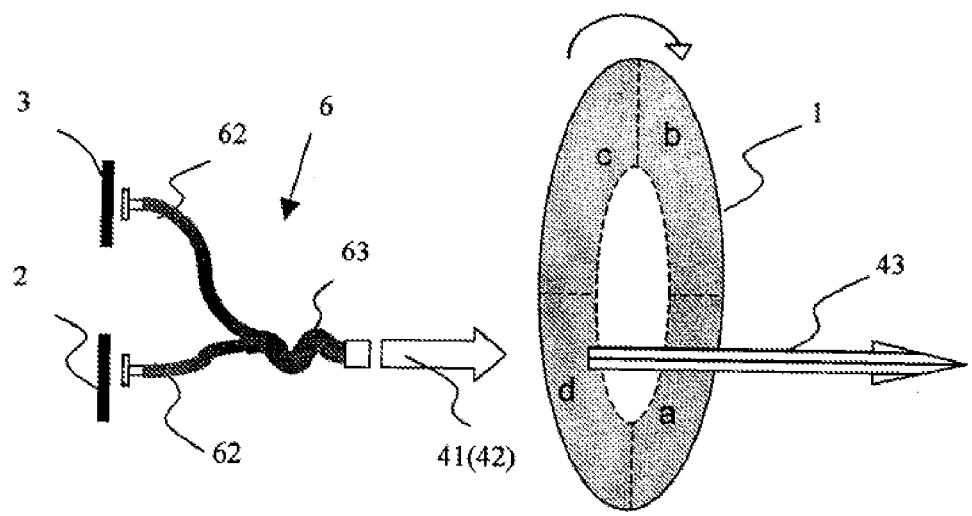
FIG. 1 shows a schematic structure of a current light source system.
Figure 2:
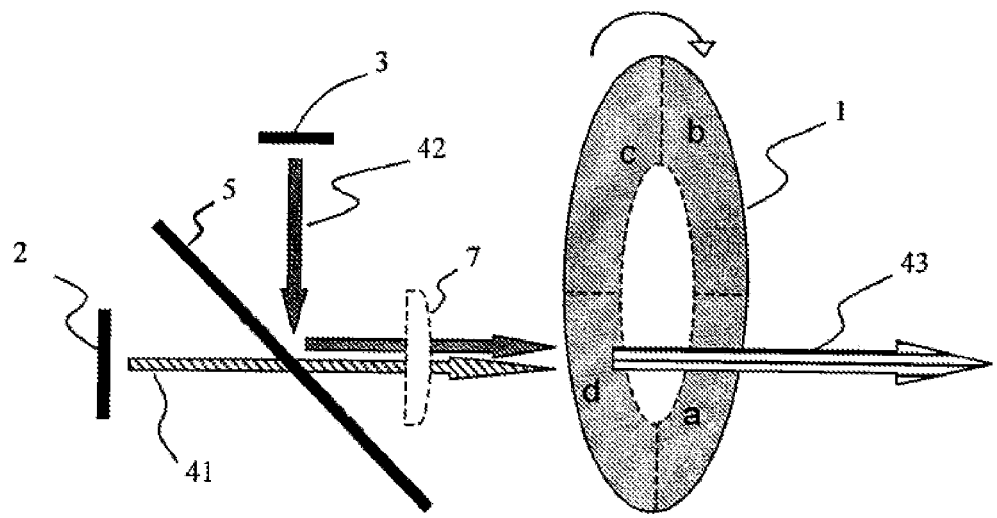
FIG. 2 shows a schematic structure of another current light source system.
Figure 3:
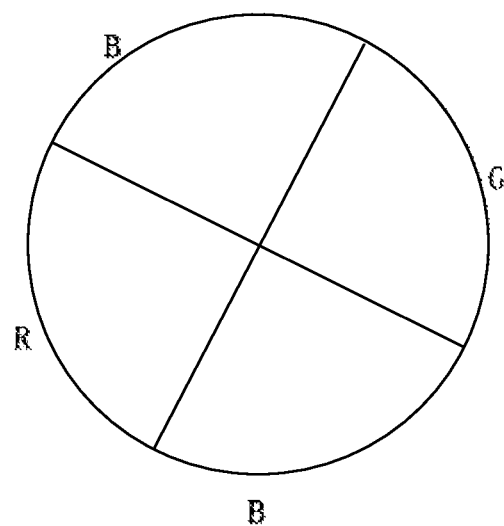
FIG. 3 shows a color wheel shown in FIG. 1 and FIG. 2.
Figure 4:
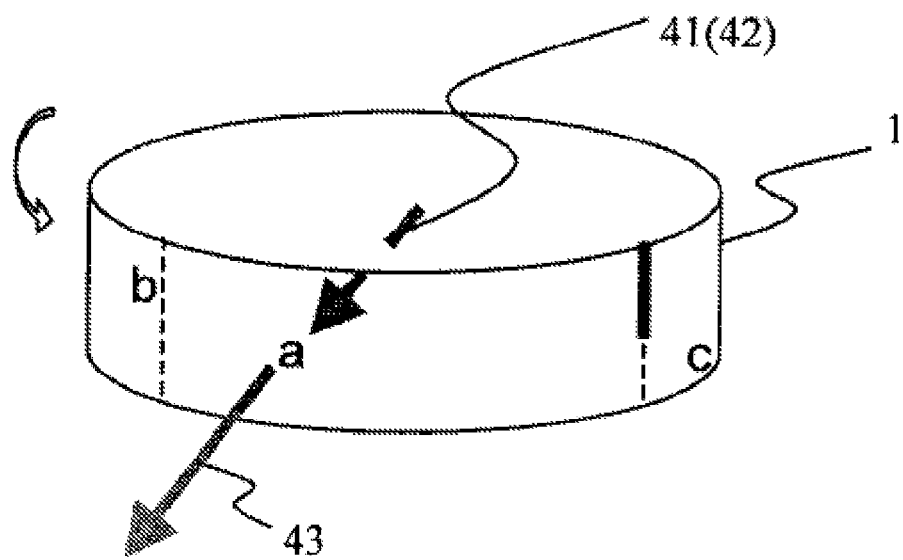
FIG. 4 shows an embodiment of the color-adjusting apparatus of the present invention.
Figure 5:
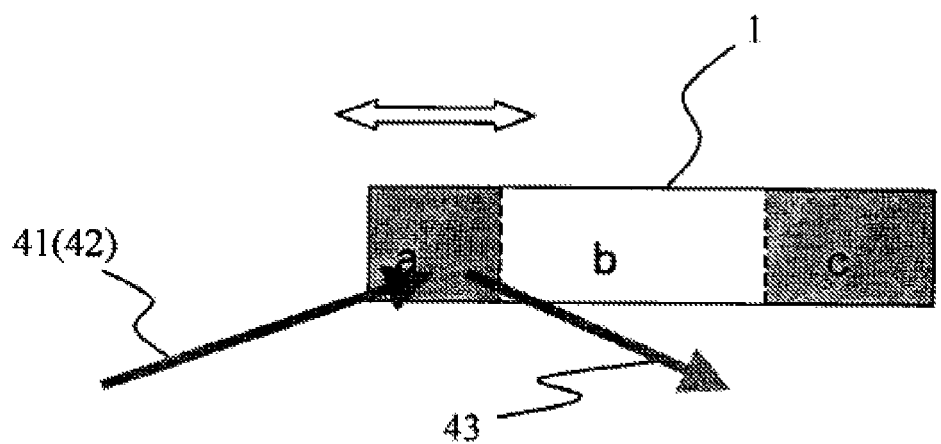
FIG. 5 shows another embodiment of the color-adjusting apparatus of the present invention.

As described in the background technology, current control method includes:

providing the light source, the light from a first light emitting source 2 and a second light emitting source 3 being directed through a light path to a color-adjusting apparatus 1, wherein the light can be directed by the coupling/conducting apparatus 6 or the dichroic filter 5 or any other suitable optical system;

dividing the moving surface of the color-adjusting apparatus into at least two segments, wherein the segments have different wavelength conversion characteristics by containing various (including no) wavelength conversion materials (including phosphors, paints, quantum dots, etc.), the movement of the surface resulting in that different segments are disposed in the light path at different times to generate output light of different wavelength 43 sequentially, wherein the color-adjusting apparatus may include the color wheel shown in FIG. 1-3, or may be a rotary cylinder or a moving plate shown in FIG. 4 and FIG. 5 respectively (where arrows indicate the direction of movement) (note that FIGS. 4 and 5 are embodiments of the present invention), and wherein the output light sequence of different wavelength is transmitted or reflected (shown in FIG. 5) out of the light source;

Based on and modifying the above steps, in embodiments of the present invention, one segment of the color-adjusting apparatus (for example, the discrete blue segments) contains no wavelength conversion material, this segment allowing the light from the light path which is emitted by the first light emitting source 2 or the second light emitting source 3 to be output as an output light of the light source.

The embodiment of the present invention further includes:

monitoring the movement of the color-adjusting apparatus 1 and controlling either the second light emitting source 2 or the second light emitting source 3, wherein the controlled light emitting source is shut off when the segment containing no wavelength conversion material is disposed in the light path. Referring to the embodiment in FIG. 3 as an example, assuming the first light emitting source 2 is a blue LED, and the second light emitting source 3 is a UV LED, the second light emitting source 3 will be controlled. Similarly, when the light to be generated by the segments are desired to be other colors, the first and second light emitting source 2 and 3 can be light sources of other colors correspondingly. And the LED can be replaced by other solid state light sources with the same quick response.

To monitor the movement of the color-adjusting apparatus 1, a positioning apparatus on the color-adjusting apparatus 1 may be used to generate a positioning signal synchronized with the movement of the color-adjusting apparatus 1 for the control unit of the light source.

When an embodiment of the present invention is applied to projection systems, in order to achieve a "completely dark" period on the screen, the embodiment further includes: both first light emitting source 2 and the second light emitting source 3 are controlled to be shut off in a specific period.

Taking the color wheel (FIG. 3) as an example, the positioning apparatus may be but is not limited to a protrusion on the edge of the color wheel. A photodetector or an electrical contact detector can be located adjacent the color-adjusting apparatus aimed at a specific position. When the protrusion of the color wheel is at the specific position due to the periodic rotation of the wheel, a periodic pulse can be generated as the positioning signal. The position signal can indicate the beginning of a specific segment and accurate information of the wheel's position can be acquired with knowledge of the structure of the wheel. This positioning apparatus may also be but is not limited to a reflective or absorptive strip on a rotary cylinder as shown in FIG. 4. The strip reflects or absorbs the light from a detection light emitter into a detecting device so that a corresponding pulse signal is generated to indicate the beginning of a specific segment as the strip rotates with the cylinder. Moreover, when the movement of the color-adjusting apparatus is driven by a servo motor, the servo motor may output a signal about the angle or position of its movement which can be used as the positioning signal of the positioning apparatus. The positioning apparatus may also be a photo-detector at the edge of the output light path after the color-adjusting apparatus. The photo-detector's response varies with the wavelength of the light, thus generating a signal synchronized with rotation of the color-adjusting apparatus which can be used as the positioning signal. The positioning apparatus can also be a linear or round grating ruler on the color-adjusting apparatus. A photoelectrical detector outside of the color-adjusting apparatus can "read" the grating ruler and generate the positioning signal directly.

Figure 6:
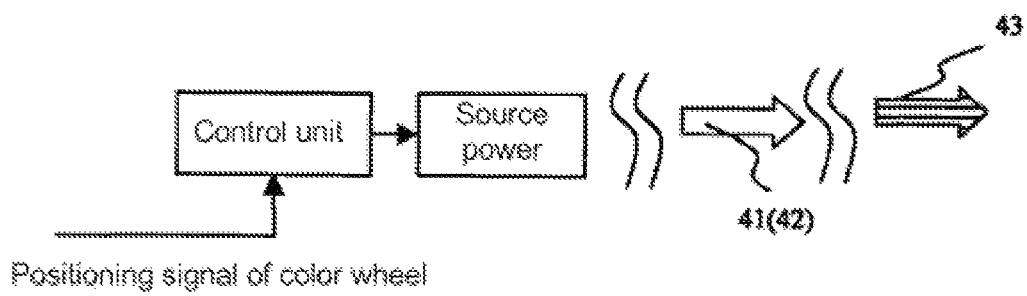
FIG. 6 is a block diagram of the light system according to an embodiment of the present invention.

Therefore, the light source structure according to an embodiment of the present invention includes: a first light emitting source 2; a second light emitting source 3; and a color-adjusting apparatus 1 including at least two segments with different wavelength conversion characteristics, wherein one segment of the color-adjusting apparatus 1 contains no wavelength conversion material, this segment allowing the light from the light path which is emitted by the first light emitting source 2 to be output as an output light of the light source. As shown in FIG. 6, the embodiment of the present invention further includes a control unit and a positioning apparatus (not shown in the figure) on the color-adjusting apparatus 1, the positioning apparatus providing a positioning signal synchronized with the movement of the color-adjusting apparatus 1 to the control unit, the control unit providing a control signal to the power supply of the second light emitting source 3 and shutting off or turning on the power supply to change the light source's working status. Based on this structure, the control unit can optionally provide another control signal to the power supply of the first light emitting source 2. Thus, two signals are used to control both the output of light 41 and 42 from the first and second light emitting source 2 respectively, which can generate a "completely dark" output light 43 in a period.

In detail, the light source according to the embodiment of the present invention may also include a dichroic filter 5 that combines the light from its two sides emitted by the first light emitting source 2 and the second light emitting source 3 into the light path in a manner of transmitting and reflecting the light respectively. A lens 7 can also be inserted at the end of the light path to focus the light onto the color-adjusting apparatus 1. These technologies and their alternative technologies are well known to those skilled in the art, therefore, no more details will be described here for simplicity.

Correspondingly, in order to provide a color light sequence including red, green and blue, the projection system using the light source according to embodiments of the present invention has a light source that includes: a first light emitting source 2, a second light emitting source 3, and a color-adjusting apparatus 1 including at least three segments with different wavelength conversion characteristics, which work in the way as the structure described above. One segment contains no wavelength conversion material. For example, the segment containing no wavelength conversion material can allow the light from the light path which is emitted by the first light emitting source 2 to be output as an output light of the light source. The light source further includes a positioning apparatus on the color-adjusting apparatus 1 providing a positioning signal for the control unit of the projection system, the control unit providing a control signal for the power supply of the second light emitting source 3. The projection system further includes a light valve for modulating the red, green and blue light to form a colored image, and a projection lens for projecting the modulated red, green and blue light onto a screen to form the image. The projection system further includes an image signal processor controlling the output light of the light source system by a driving signal and providing the image data for the light valve. The control unit can be a unit in the image signal processor. The light valve can be a DMD. When the first light emitting source 2 is a blue LED, the second light emitting source can be a UV LED. The segments of the color-adjusting apparatus include a segment or segments with a red phosphor and a segment or segments with a green phosphor.

It has been shown in practice that about half of the power consumption required to generate the blue light can be saved in the system by the present invention. The amount of reduced power consumption depends on the ratio of blue light to the total light used in the projection system. For example, if the ratio is 1/3, then 16.66 percent of the power consumption can be saved. Additionally, the UV light source is pulse driven, which can increase its lifetime.

It will be apparent to those skilled in the art that various modification and variations can be made in the light source apparatus and related method of the present invention without departing from the spirit or scope of the invention. Thus, it is intended that the present invention cover modifications and variations that come within the scope of the appended claims and their equivalents.

What is claimed is:

1. A light source comprising:
    a first light emitting source;
    a second light emitting source;
    a color-adjusting apparatus including at least two segments with different wavelength conversion characteristics, wherein one or more of the segments each contains a wavelength conversion material, and one segment contains no wavelength conversion material;
    an optical system for directing a light from the first light emitting source and a light from the second light emitting source through a light path to the color-adjusting apparatus,
    wherein different segments of the color-adjusting apparatus are disposed in the light path at different times when the color-adjusting apparatus moves, wherein the segment containing no wavelength conversion material allows the light from the light path which is emitted by the first light emitting source to be output as an output light of the light source;
    a control unit; and
    a positioning apparatus disposed on or adjacent the color-adjusting apparatus, the positioning apparatus generating a positioning signal synchronized with a movement of the color-adjusting apparatus for the control unit, wherein the positioning apparatus includes a servo motor which drives the color-adjusting apparatus and outputs a signal indicating an angle or position of the color-adjusting apparatus as the positioning signal,
    the control unit providing a control signal to a power supply of the second light emitting source based on the positioning signal to turn the second light emitting source off when the positioning signal indicates that the segment containing no wavelength conversion material is disposed in the light path.

2. The light source of claim 1, wherein the color-adjusting apparatus includes a rotating wheel, a moving plate or a rotating cylinder.

3. The light source of claim 1, wherein the first light emitting source is a blue light emitting diode (LED), and the second light emitting source is an ultraviolet (UV) LED.

4. The light source of claim 1, wherein the control unit further provides another control signal to a power supply of the first light emitting source.

5. The light source of claim 1, wherein the optical system includes a dichroic filter receiving two lights emitted by the first light emitting source and the second light emitting source on two sides of the dichroic filter and combining them into the light path by transmitting one of the two lights and reflecting the other one of the two lights.

6. The light source of claim 1, wherein the optical system includes a multi-optical fiber having multiple optical fibers at one end for collecting the light from the first light emitting source and second light emitting source, and having one optical fiber at another end combined by the multiple optical fibers for directing the collected light to the color-adjusting apparatus.

7. The light source of claim 1, wherein the positioning apparatus includes a protrusion on an edge of the color-adjusting apparatus and a photodetector or an electrical contact detector located adjacent the color-adjusting apparatus, the photodetector or electrical contact detector being aimed at a predefined position and generating a periodic pulse signal as the positioning signal when the protrusion of the color-adjusting apparatus is located at the predefined position.

8. The light source of claim 1, wherein the positioning apparatus includes a reflective or absorptive strip on the color-adjusting apparatus, a detection light emitter for emitting a detection light onto the color-adjusting apparatus, and a detecting device for detecting reflected detection light from the strip, the detecting device generating a pulse signal based on the reflected detection light as the positioning signal.

9. The light source of claim 1, wherein the positioning apparatus includes a photo-detector in an output light path after the color-adjusting apparatus for detecting a color of the output light and generating a signal as the positioning signal upon detecting a predefined color change.

10. The light source of claim 1, wherein the positioning apparatus includes a linear or round grating ruler on the color-adjusting apparatus and a photoelectrical detector adjacent the color-adjusting apparatus for reading the grating ruler and generate a signal based on the reading as the positioning signal.

11. A control method for a light source, comprising:
    directing a light from a first light emitting source and a light from a second light emitting source through a light path to a color-adjusting apparatus;
    dividing a surface of the color-adjusting apparatus into at least two segments with different wavelength conversion characteristics, wherein one or more of the segments each contains a wavelength conversion materials and one segment contains no wavelength conversion material for allowing the light from the light path which is emitted by the first light emitting source to be output as an output light;
    moving the surface of the color-adjusting apparatus so that different segments are disposed in the light path at different times to generate output light of different wavelength sequentially; and
    monitoring a movement of the surface of the color-adjusting apparatus and controlling the second light emitting source based on the movement, including providing a positioning apparatus disposed on or adjacent the color-adjusting apparatus, the positioning apparatus generating a positioning signal synchronized with the movement of the color-adjusting apparatus used for controlling the second light emitting source, the positioning apparatus including a servo motor which drives the color-adjusting apparatus and outputting a signal indicating an angle or position of the color-adjusting apparatus as the positioning signal, wherein the second light emitting source is shut off when the segment containing no wavelength conversion material is disposed in the light path.

12. The control method of claim 11, wherein the color-adjusting apparatus includes a rotating wheel, a moving plate or a rotating cylinder.

13. The control method of claim 11, wherein the first light emitting source is a blue light emitting diode (LED), and the second light emitting source is an ultraviolet (UV) LED.

14. The control method of claim 11, wherein the directing step includes providing a dichroic filter in the light source, the dichroic filter receiving two lights emitted by the first light emitting source and the second light emitting source on two sides of the dichroic filter and combining them into the light path by transmitting one of the two lights and reflecting the other one of the two lights.

15. The control method of claim 11, wherein the directing step includes providing a multi-optical fiber having multiple optical fibers at one end for collecting the light from the first light emitting source and second light emitting source, and having one optical fiber at another end combined by the multiple optical fibers for directing the collected light to the color-adjusting apparatus.

16. The control method of claim 11, further comprising:
controlling both the first light emitting source and the second light emitting source according to the monitoring result so that both the first light emitting source and the second light emitting source are shut off in a predefined period.

17. A projection system having a light source comprising:
a light source that includes a first light emitting source, a second light emitting source, a color-adjusting apparatus having at least three segments with different wavelength conversion characteristics, and an optical system for directing a light from the first light emitting source and a light form the second light emitting source through a light path to the color-adjusting apparatus, wherein different segments of the color-adjusting apparatus are disposed in the light path at different times when the color-adjusting apparatus moves to generate output light of different wavelength sequentially including red, green and blue colors, wherein one segment of the color-adjusting apparatus contains no wavelength conversion material and allows the light from the light path which is emitted by the first light emitting source to be output as an output light of the light source, the light source further including a positioning apparatus disposed on or adjacent the color-adjusting apparatus, the positioning apparatus including a servo motor which drives the color-adjusting apparatus and outputs a signal indicating an angle or position of the color-adjusting apparatus as a positioning signal which is synchronized with a movement of the color-adjusting apparatus for the control unit;
a light valve for modulating the red, green and blue light to form a color image;
a projection lens for projecting the modulated red, green and blue light onto a screen to form the image;
an image signal processor controlling the light of the light source system by a driving signal and providing the image data for the light valve; and
a control unit receiving the positioning signal and providing a control signal for a power supply of the second light emitting source based on the positioning signal to turn the second light emitting source off when the positioning signal indicates that the segment containing no wavelength conversion material is disposed in the light path.

18. The projection system of claim 17, wherein the first light emitting source is a blue LED, the second light emitting source is a UV LED, and the segments of the color-adjusting apparatus include at least one segment with a red phosphor and at least one segment with a green phosphor.

* * * * *